(12) United States Patent
Shimpi et al.

(10) Patent No.: US 12,327,134 B2
(45) Date of Patent: Jun. 10, 2025

(54) METHOD AND SYSTEM FOR PREDICTING BATCH PROCESSES

(71) Applicant: Tata Consultancy Services Limited, Mumbai (IN)

(72) Inventors: Vikrant Vikas Shimpi, Pune (IN); Maitreya Natu, Pune (IN); Neha Behl, Pune (IN); Vaishali Paithankar Sadaphal, Pune (IN); Satya Narayana Samudrala, Pune (IN); Deepa Vaidyanathan, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 472 days.

(21) Appl. No.: 17/937,715

(22) Filed: Oct. 3, 2022

(65) Prior Publication Data

US 2023/0103795 A1   Apr. 6, 2023

(30) Foreign Application Priority Data

Oct. 5, 2021  (IN) .............................. 202121045328

(51) Int. Cl.
*G06F 9/48* (2006.01)
*G06Q 10/04* (2023.01)

(52) U.S. Cl.
CPC .......... *G06F 9/4881* (2013.01); *G06Q 10/04* (2013.01)

(58) Field of Classification Search
None
See application file for complete search history.

(56) References Cited

U.S. PATENT DOCUMENTS

| 8,990,820 B2 * | 3/2015 | Plancarte .............. G06F 9/4843 718/101 |
| 9,715,409 B2 * | 7/2017 | Hosokawa .............. G06F 11/30 |

(Continued)

FOREIGN PATENT DOCUMENTS

| AU | 2016210785 A1 | 2/2017 |
| CN | 104636871 A | 2/2018 |
| CN | 111737095 A | 10/2020 |

OTHER PUBLICATIONS

Aumi et al. "Model Predictive Quality Control of Batch Processes", 2012 IEEE, pp. 5646-5651.*

(Continued)

*Primary Examiner* — Van H Nguyen
(74) *Attorney, Agent, or Firm* — Finnegan, Henderson, Farabow, Garrett & Dunner, LLP

(57) ABSTRACT

This disclosure relates generally to method and system for predicting batch processes. Conventional batch schedulers provide a single point of control for defining and monitoring background executions in a distributed network. The method of the present disclosure obtains a set of batch jobs from one or more users to generate a set of batch graphs by deriving a metadata. Further, a set of batch models is generated for the set of batch graphs. The set of batch models includes at least one of a forecasting model, a job-job regression model, and a job-workload regression model. Further, a batch job schedule is generated for the set of batch graphs to predict a revised batch job schedule with a real time feed and the set of batch models. Additionally, a proactive notification is sent to each user alarming one or more unexpected delays indicating the revised batch job schedule.

15 Claims, 3 Drawing Sheets

(56) References Cited

U.S. PATENT DOCUMENTS

| | | | |
|---|---|---|---|
| 10,025,659 B2 | 7/2018 | Shinde et al. | |
| 11,656,932 B2* | 5/2023 | Mahamuni | G06F 11/3409 |
| | | | 714/48 |
| 11,734,062 B2* | 8/2023 | Bahl | G06F 9/5038 |
| | | | 718/102 |
| 12,056,524 B2* | 8/2024 | Xu | G06F 9/485 |
| 12,175,389 B2* | 12/2024 | Kulkarni | G06F 11/3072 |
| 2005/0198636 A1* | 9/2005 | Barsness | G06F 11/3452 |
| | | | 718/100 |
| 2019/0392441 A1* | 12/2019 | Lee | G06N 20/00 |
| 2022/0188148 A1 | 6/2022 | Zhu et al. | |

OTHER PUBLICATIONS

Tsai et al. "Predictive Control of Batch Processes Using Principal Surface/Space Analysis and Fuzzy Clustering Empirical Models", 2001 AACC, pp. 1005-1009.*

Xiao et al. "A Modeling Method for Quality Prediction of Batch Process", 2011 IEEE, pp. 4110-4114.*

Behl et al. "Making Batch Systems Predictable", 2019 IEEE, pp. 477-480.*

Bandeiraa, Saymon Galvao et al., "Comparison of selection and combination strategies for demand forecasting methods", Research Article, Date: Jan. 2020, Publisher: Research Gate, https://www.scielo.br/j/prod/a/tdXXZyH4tJCMZDgzQHVYxhx/?lang=en&format=pdf.

* cited by examiner

METHOD AND SYSTEM FOR PREDICTING BATCH PROCESSES

PRIORITY CLAIM

This U.S. patent application claims priority under 35 U.S.C. § 119 to: Indian Patent Application No. 202121045328, filed on Oct. 5, 2021. The entire contents of the aforementioned application are incorporated herein by reference.

TECHNICAL FIELD

The disclosure herein generally relates to batch processing, and, more particularly, to method and system for predicting batch processes.

BACKGROUND

Enterprises heavily rely on batch processing systems to ensure business operations such as retail, banking, insurance and thereof. Retail industries run batch processes to modify prices for promotional campaign, generating purchase orders for store inventory replenishments, updating bill books, and thereof. Any delay in processing batch delays direct sales impact, revenue, customer experience, brand image and the like. It is very important to ensure scalable completion of the batch processes, to prevent adverse impact on subsequent business operations.

Graphical user interfaces are often used by end users to interact with the enterprise platforms. More specifically, computer application(s) can represent a single point of control for defining and monitoring background executions in a distributed network of computing device. Such a computer application is often referred to as a "batch scheduler" or "job scheduler." When an end user initiates a job (e.g., by submitting a request through the graphical user interface), there is no indication as to when execution of the job will begin or when the job will be finished. The end user must simply wait until execution has finished and the outcome of the job is available for review.

In general, batch processes are defined as a set of batch jobs connected through precedence relationships. The batch processes consists of a network for the set of batch jobs constructed through complex set of the precedence relationships. Each batch job has a batch schedule that defines batch dates for scheduling its execution. Batch jobs are generally either command jobs that execute a set of commands that monitor, read, or write into one or more files. Due to inherent nature of schedule and dependencies, batch graph with corresponding start time and execution time varies for enterprises on different days. Failures and execution anomalies add to non-determinism of the batch process. Batch command centers today rely on batch schedulers and batch monitoring tools. Batch schedulers focus on defining and automating the execution of the batch processes. Existing techniques provide descriptive analysis and statistical extrapolations of the batch process. However, such techniques lack in predicting dynamic behavior of overall batch job providing early warning of potential interruptions and if any deadline delays.

SUMMARY

Embodiments of the present disclosure present technological improvements as solutions to one or more of the above-mentioned technical problems recognized by the inventors in conventional systems. For example, in one embodiment, a system for predicting batch processes is provided. The system includes obtaining a set of batch jobs from one or more users. Each batch job comprises a dependency data, a schedule data, a run history data, a service level agreement (SLA), a workload data, and a constant start time. The run history data comprises a start time and an end time. Further, a set of batch graphs are generated for the set of batch jobs by deriving a metadata for identifying a dependency data relation, and the schedule data. Here, the metadata is derived by applying a process flow mining technique on the run history data. The dependency data relation includes at least one of a direct relation, a casual relation, a parallel relation, and a choice relation. In each batch graph, a node represents a batch job, an edge represents a precedence relation between the two corresponding batch jobs. Further, a set of batch models for the set of batch graphs are generated by using the run history data, the workload data, and the dependency data relation. The set of batch models includes at least one of a forecasting model, a job-job regression model, and a job-workload regression model. Further, a batch job schedule is generated for the set of batch graphs comprising a batch job execution date, and a batch job execution status.

Further, a revised batch job schedule for the set of batch graphs is predicted based on a real time feed and the set of batch models, and one or more critical paths are updated for constraints included in the service level agreement specifying one or more unexpected delays occurred while executing the set of batch graphs with the real time feed. The revised batch job schedule is annotated with a revised start time, a revised end time, a revised run time, and a revised service level agreement threshold. Further, a proactive notification is sent to each user alarming the one or more unexpected delays indicating the revised batch job schedule.

In another aspect, a method for predicting batch processes is provided. The method includes obtaining a set of batch jobs from one or more users. Each batch job comprises a dependency data, a schedule data, a run history data, a service level agreement (SLA), a workload data, and a constant start time. The run history data comprises a start time and an end time. Further, a set of batch graphs are generated for the set of batch jobs by deriving a metadata for identifying a dependency data relation, and the schedule data. Here, the metadata is derived by applying a process flow mining technique on the run history data. The dependency data relation includes at least one of a direct relation, a casual relation, a parallel relation, and a choice relation. In each batch graph, a node represents a batch job, an edge represents a precedence relation between the two corresponding batch jobs. Further, a set of batch models for the set of batch graphs are generated by using the run history data, the workload data, and the dependency data relation. The set of batch models includes at least one of a forecasting model, a job-job regression model, and a job-workload regression model. Further, a batch job schedule is generated for the set of batch graphs comprising a batch job execution date, and a batch job execution status.

Further, a revised batch job schedule for the set of batch graphs is predicted based on a real time feed and the set of batch models, and one or more critical paths are updated for constraints included in the service level agreement specifying one or more unexpected delays occurred while executing the set of batch graphs with the real time feed. The revised batch job schedule is annotated with a revised start time, a revised end time, a revised run time, and a revised service level agreement threshold. Further, a proactive notification is sent to each user alarming the one or more unexpected delays indicating the revised batch job schedule.

In yet another aspect, a non-transitory computer readable medium for obtaining a set of batch jobs from one or more users. Each batch job comprises a dependency data, a schedule data, a run history data, a service level agreement (SLA), a workload data, and a constant start time. The run history data comprises a start time and an end time. Further, a set of batch graphs are generated for the set of batch jobs by deriving a metadata from a dependency data relation, and the schedule data. The metadata is derived by applying a process flow mining technique on the run history data. The dependency data relation includes at least one of a direct relation, a casual relation, a parallel relation, and a choice relation. In each batch graph, a node represents a batch job, an edge represents a precedence relation between the two corresponding batch jobs. Further, a set of batch models for the set of batch graphs are generated by using the run history data, the workload data, and the dependency data relation. The set of batch models includes at least one of a forecasting model, a job-job regression model, and a job-workload regression model. Further, a batch job schedule is generated for the set of batch graphs comprising a batch job execution date, and a batch job execution status.

Further, a revised batch job schedule for the set of batch graphs is predicted based on a real time feed and the set of batch models, and one or more critical paths are updated for constraints included in the service level agreement specifying one or more unexpected delays occurred while executing the set of batch graphs with the real time feed. The revised batch job schedule is annotated with a revised start time, a revised end time, a revised run time, and a revised service level agreement threshold. Further, a proactive notification is sent to each user alarming the one or more unexpected delays indicating the revised batch job schedule.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for predicting batch processes. Conventional batch schedulers typically provide a graphical user interface that may represent a single point of control for defining and monitoring background executions in a distributed network of computing devices. However, when the end user initiates the particular job, there is no indication as to when execution of the job will begin or when the job will be finished.

The method disclosed predicts a revised batch job schedule by processing a set of batch jobs received as inputs from one or more users. The set of batch jobs is processed to generate a set of batch graphs by deriving a metadata. The metadata identifies a data dependency relation by applying a process flow mining technique over a run history data. The dependency data relation includes at least one of a direct relation, a casual relation, a parallel relation, and a choice relation. Further, a set of batch models is generated for the set of batch graphs to construct a batch job schedule. Here, the set of batch models comprises a forecasting model, a job-job regression model and a job-workload regression model. The set of batch graphs are updated with real time feeds to predict the revised batch job schedule. Eventually, the disclosed method sends a proactive notifications to each user specifying unexpected anomalies occurred such as one or more failures, on-hold delays which are likely impacting the constraints mentioned in a service level agreement (SLA). The disclosed system is further explained with the method as described in conjunction with FIG. 1 to FIG. 3 below.

Figure 1:
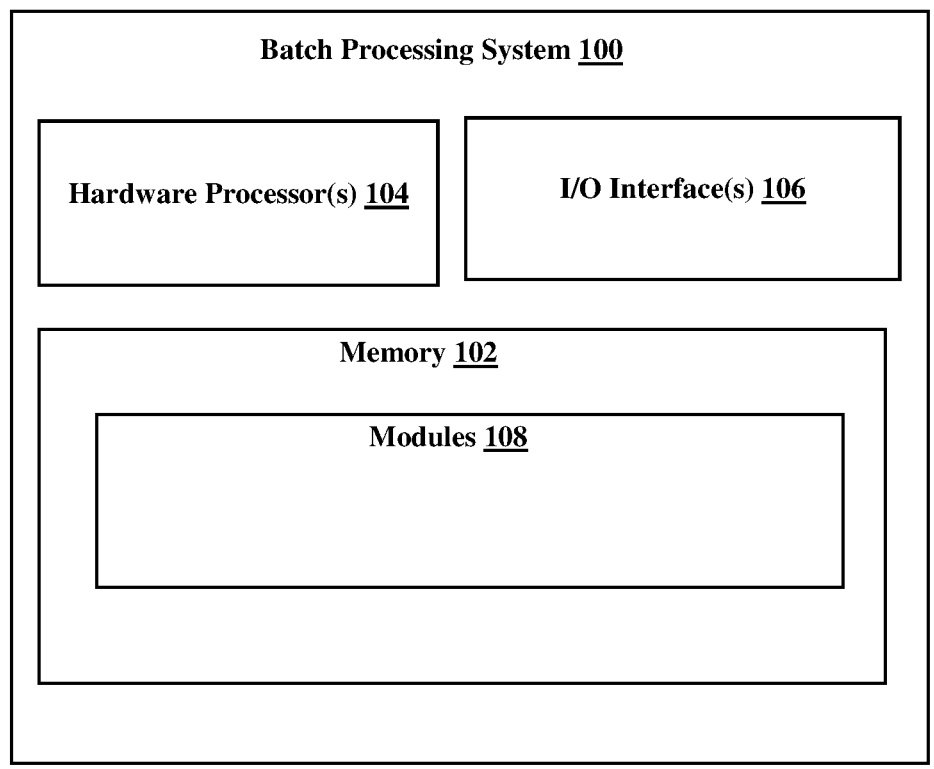
FIG. 1 illustrates an exemplary block diagram of a system (alternatively referred as batch processing system) to predict a batch job schedule, in accordance with some embodiments of the present disclosure.
Figure 2:
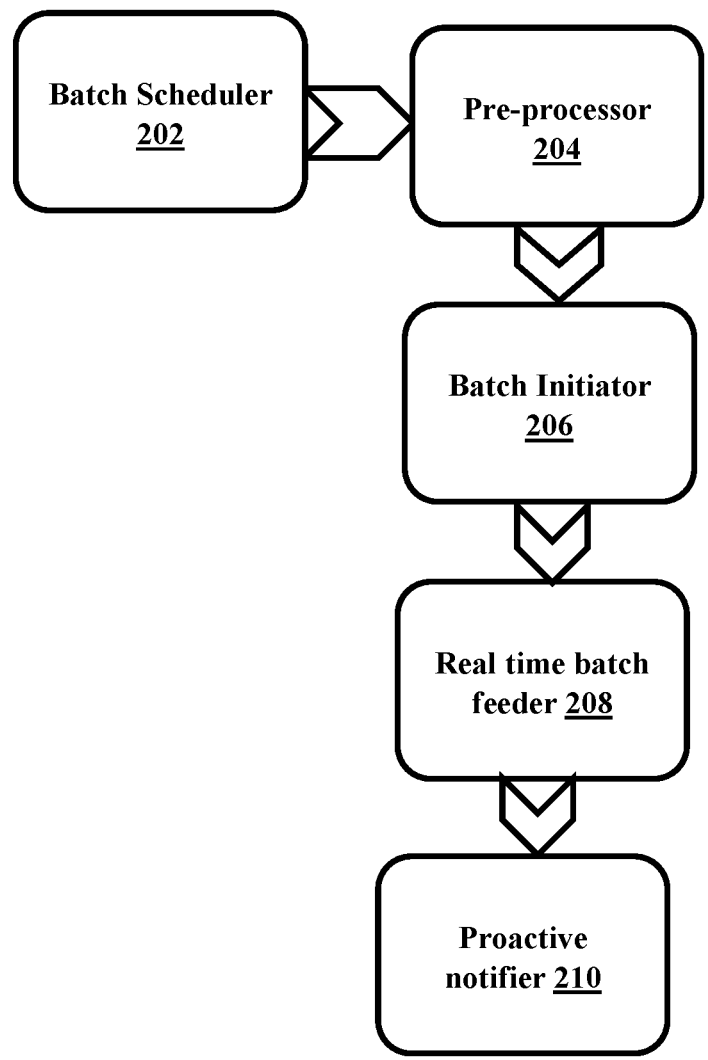
FIG. 2 illustrates a functional block diagram of the batch processing system of FIG. 1, in accordance with some embodiments of the present disclosure.
Figure 3:
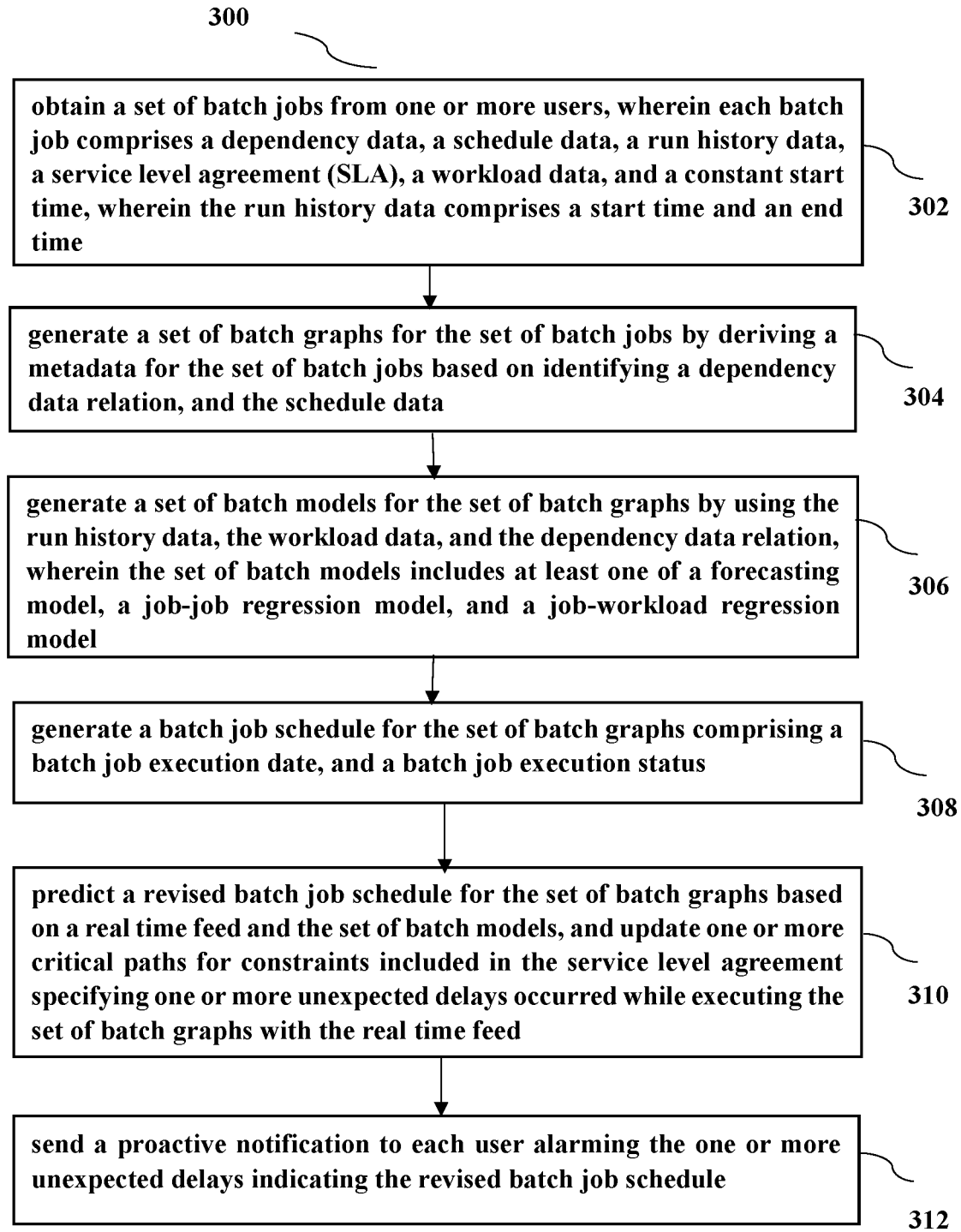
FIG. 3 illustrates a flow diagram to predict batch processes using the batch processing system, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as batch processing system) to predict a batch job schedule, in accordance with some embodiments of the present disclosure. In an embodiment, the batch processing system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 102 may comprise information pertaining to input(s)/output(s) of each step performed by the processor(s) 104 of the system 100 and methods of the present disclosure. Functions of the components of system 100, for predicting batch processes, are explained in conjunction with FIG. 2 and FIG. 3 providing flow diagram, architectural overviews, and performance analysis of the system 100.

FIG. 2 illustrates a functional block diagram of the batch processing system of FIG. 1, in accordance with some embodiments of the present disclosure. The batch processing system 100 includes a plurality of components comprising a batch scheduler 202, a preprocessor 204, a batch initiator 206, a real time job feeder 208, and a proactive notifier 210.

The batch processing system 100 processes the set of batch jobs received as inputs to predict a revised batch job schedule specifying one or more unexpected delays for the unmatched constraints included in the service level agreement. The predicted revised batch job schedule adapts in real time based on ongoing workloads, one or more anomalies, unexpected failures occurred while executing each batch job and the like ensuring high prediction accuracies.

The batch scheduler 202 extracts from each batch job a dependency data, a schedule data, a run history data, a service level agreement (SLA), a workload data, and a constant start time. The run history data comprises a start time and an end time.

The preprocessor 204 processes the set of batch jobs. The metadata handler generates a set of batch graphs for the set of batch jobs by identifying missing data dependency relation, and missing schedules. The metadata is derived by applying a process flow mining technique on the run history data.

The batch initiator 206 predicts a batch job schedule for the set of batch graphs including a current day of the set of batch jobs scheduled based on batch job attributes from the batch scheduler 202.

The real time job processor 208 feeds real time data to the set of batch graphs. This further adapts and updates changes in real time predicting unexpected failures. The set of batch graphs are updated with minimal annotated data and with one or more critical paths of the SLA.

The proactive notifier 210 notifies the one or more user specifying unexpected events failures, one or more delays, and the SLA.

FIG. 3 is a flow diagram illustrating a method for predicting batch processes using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2, and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 obtain a set of batch jobs from one or more users, wherein each batch job comprises a dependency data, a schedule data, a run history data comprises a start time and an end time, a service level agreement (SLA), a workload data, and a constant start time. Typically, one or more end users interact with the system 100 for feeding the set of batch jobs as inputs. Further, the system 100 extracts a set of batch job attributes comprising the dependency data, the schedule data, the run history data, the service level agreement (SLA), the workload data, and the constant start time. The set of batch job attributes (also referred as batch job attributes) is assigned to each batch job node having the schedule data that defines calendar date when the batch job is scheduled to execute. For example, the one or more end users query the system 100 to acquire a (current) status of the scheduled batch job where the system 100 generates a response for the one or more queries predicting one or more delays.

The dependency data relation represents a precedence relationship between the two associated batch jobs. The schedule data includes a job run calendar. The run history data includes historic run information having a start time and an end time.

Referring now to the steps of the method 300, at step 304, the one or more hardware processors 104 generate a set of batch graphs for the set of batch jobs by deriving a metadata for the set of batch jobs based on identifying a dependency data relation, and the schedule data. The metadata is derived by applying a process flow mining technique on the run history data. The dependency data relation includes at least one of a direct relation, a casual relation, a parallel relation, and a choice relation. In each batch graph, a node represents a batch job, an edge represents a precedence relation between the two associated batch jobs. Referring now the above example, the set of batch graphs are built by modelling the set of batch jobs. Further, the system 100 extracts one or more batch job attributes from each batch job. The precedence relationship between two associated batch jobs are modeled as the batch job edge. The batch job edges have metaphors such as an AND operation, an OR operation, an EXOR operation and thereof for dependency data dynamics.

The metadata is derived for the set of batch jobs for identifying the dependency data relation, and the schedule data by applying the process flow mining technique on the run history data. Missing schedule data is identified by clustering similar start time of each batch job from the run history data. The schedule data captures the schedule information of the set of batch jobs having the batch date representing when the batch job executes. The start time of each batch job is clustered, and the constant start time is identified if inter cluster distance is minimal.

The method further identifies missing dependency data relation relationship for the set of batch jobs based on at least one of the direct relation, a casual relation, a parallel relation, and a choice relation.

Direct relation is executed when relation between X and Y is direct, when job Y always executes after completion of job X.

Causal relation is executed when relation between X and Y is causal, if job Y runs after completion of job X and not job X runs after completion of job Y.

Parallel relation is executed when relation between X and Y is parallel if both job X and job Y can run after the other.

Choice relation is executed when relation between X and Y is choice if job X and job Y never run one after the other.

The direct relation and the casual relation are considered as the dependency data relation, when a confidence value and a coverage value are above a predefined threshold based on a domain preference. This predefined threshold is an user defined threshold and is used to select strong dependency data relation thereby eliminating the weak relations. The confidence value is defined as a percentage of instances where the precedence relationship holds true. The coverage value is defined as the number of instances in the run history data where the precedence relationship holds true. Parallel relationship is validated using graph traversal and retained if the relation is not forming loops or indirect relations. For example, if there exists three batch jobs A, B and C. Relation between A→C is called indirect if there exist a relation between A→B and A→C. The indirect edges are retained as dependency data and eliminated based on the predefined threshold based on user preference in the batch processing system 100.

Referring now to the steps of the method 300, at step 306, the one or more hardware processors 104 generate a set of batch models for the set of batch graphs by using the run history data, the workload data, and the dependency data relation. The set of batch models includes at least one of a forecasting model, a job-job regression model, and a job-workload regression model. The set of batch models is generated for the set of batch graphs by using the run history data, the workload data, and the dependency data relation.

The forecasting model executes the set of batch graphs to determine a forecasted start time, and a forecasted run time by performing the steps, the set of batch graphs are executed over a plurality of forecasting techniques for the start time, and the run time associated with the run history data. Further, the method identifies one or more errors while executing the set of batch graphs over the plurality of forecasting techniques for the run history data. Each forecasting technique is assigned with a rank based on each error occurrence is below a predefined error threshold. The predefined error threshold helps in eliminating the weak forecasting models and this can be set or modified by the user based on the domain requirements. Then, a forecasted start time, and a forecasted run time are determined based on the rank acquired by corresponding forecasting technique among the plurality of forecasting techniques. Each batch job exhibits varying properties batch jobs that run monthly or quarterly having less historical data. The workload dependent batch jobs and the daily processing batch jobs vary when scheduled for a weekday or a weekend behavior and the like. The scheduled batch job selects the most suitable forecasting technique based on its batch job properties.

The job-job regression model processes the set of batch graphs to group two correlated batch jobs. Here, the job-job regression model determines one or more correlations between two corresponding batch jobs associated with the set of batch graphs based on the batch job run time data. Here, a job correlation coefficient is obtained for the one or more correlations. The precedence relation data is identified for the one or more correlations from the set of batch graphs. Then, the job-job regression model is computed for the set of batch graphs by grouping two correlated batch jobs when the job correlation coefficient is above a predefined regression threshold. This predefined regression threshold is a value between −1 and 1, which can be set or modified by the user with their corresponding domain requirements.

The job-workload regression model determines whether a dependency data correlation coefficient of the set of batch graph is above a predefined workload threshold. Initially, the job-workload regression model processes the set of batch graphs to determine one or more regression correlations between the batch job run time data and a batch job workload from the workload data. Further, the dependency data correlation coefficient is obtained for the one or more regression correlations. The job-workload regression model computes the set of batch graphs based on the batch job workload and the batch job run time when the dependency data correlation coefficient is above the predefined workload threshold.

The job-workload regression model processes the set of batch graphs by determining one or more regression correlations between the batch job run time data and a batch job workload from the workload data. The job-workload regression model is computed for the set of batch graphs by using the batch job workload and the batch job run time when the dependency data correlation coefficient is above a predefined workload threshold.

Referring now to the steps of the method 300, at step 308, the one or more hardware processors 104 generate a batch job schedule for the set of batch graphs comprising a batch job execution date, and a batch job execution status. The batch processing system 100 further processes the set of batch graphs to generate the batch job schedule. The set of batch jobs is executed based on the batch job schedule having the batch data execution date and the batch job execution status.

The batch job schedule is in a form of raw text format that contains dimensions of the batch job such as a day of week, a day of month and the like along with one or more logical gates (OR, AND XOR, and/or XNOR) that may be applied between one or more dimensions for the set of batch jobs. Further, each dimension of the set of batch jobs and the logical gates are separated using a text extraction regular expressions. Each dimension of the set of batch jobs is converted in time domain based on domain dictionaries to extract the schedule date. Later, the logical gates are applied on the batch job execution date that gives the exact batch date on which the batch job will run. The schedule batch jobs are flagged with true or false state which defines the batch job will run on the given batch date or not. Each batch graph for the batch job execution date includes the batch jobs with the true flag, as the scheduled batch jobs run on the specified batch date.

Referring now to the steps of the method 300, at step 310, the one or more hardware processors 104 predict a revised batch job schedule for the set of batch graphs based on a real time feed and the set of batch models. Further, one or more critical paths are updated for constraints included in the service level agreement specifying one or more unexpected delays occurred while running the set of batch graphs with the real time feed. The revised batch job schedule is annotated with a revised start time, a revised end time, a revised run time, and a revised service level agreement threshold.

The forecasted start time is obtained by executing the set of batch graphs from the forecasting model when the forecasted error is below the predefined error threshold. The forecasted end time is obtained by executing the set of batch graphs from each forecasting model along with the one or more error values. Further, the forecasted start time, and the forecasted end time are updated in a depth first search (DFS) graph traversal. The DFS utilizes the dependency data relation. The revised batch job schedule is predicted for the set of batch graphs based on the real time feed and the DFS graph traversal.

The graph traversal is updated with the forecasted start time and the forecasted end time on the node of each batch graph that are scheduled to run on the given batch job execution date. The set of batch graphs is processed on the batch job execution date by using the batch job schedule to infer the batch jobs scheduled to run on the batch date and the batch nodes precedence relationship. The plurality of forecasting models predicts the batch job run time of the set of batch graphs. The disclosed method further adapts the predictions in real time for the set of batch graphs. In real time the set of batch graphs is updated with real time feeds for prediction. The predicted set of batch graphs is annotated with the revised start time, the revised end time, and the revised run time. The workload data is further monitored in runtime and the observed changes are adapted.

Referring now to the steps of the method 300, at step 312, the one or more hardware processors 104 send (or generate and communicate) a proactive notification to each user alarming the one or more unexpected delays indicating the revised batch job schedule. The one or more unexpected delays include one or more failures, on-hold delays of each batch jobs impacting the constraints mentioned in the SLA, and the like. The SLA threshold is defined with the SLA and the end time of each batch job. Anomaly batch jobs that are in failed state and or in on-hold state are identified which affect the SLA batch jobs that are planned to run. Here, the SLA failed state and on-hold state batch job is updated with the real time feeds.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of batch processing with real time prediction. The embodiments thus provide a method and system for predicting batch processes. Moreover, the embodiments herein further enable the system and method to predict batch processes by processing a set of the batch jobs obtained from one or more users. The method captures behavioral dynamics of business by predicting the batch processes avoiding delays in real time and adapts predictions for revised batch job schedule. Such batch process predictions are connected across multiple batch schedulers. These predictions can be adapted in real-time based on workload spikes, anomalies, failures and thereof and still can ensure high prediction accuracies.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for predicting batch processes, comprising:
obtaining, via one or more hardware processor, a set of batch jobs from one or more users, wherein each batch job comprises a dependency data, a schedule data, a run history data, a service level agreement (SLA), a workload data, and a constant start time, wherein the run history data comprises a start time and an end time;
generating, via the one or more hardware processors, a set of batch graphs for the set of batch jobs by deriving a metadata for the set of batch jobs based on identifying a dependency data relation, and the schedule data,
wherein the metadata is derived by applying a process flow mining technique on the run history data,
wherein the dependency data relation includes at least one of a direct relation, a casual relation, a parallel relation, and a choice relation, and
wherein in each batch graph, a node represents a batch job, an edge represents a precedence relation between the two corresponding batch jobs;
generating, via the one or more hardware processors, a set of batch models for the set of batch graphs by using the run history data, the workload data, and the dependency data relation, wherein the set of batch models includes at least one of a forecasting model, a job-job regression model, and a job-workload regression model;
generating, via the one or more hardware processors, a batch job schedule for the set of batch graphs comprising a batch job execution date, and a batch job execution status;
predicting, via the one or more hardware processors, a revised batch job schedule for the set of batch graphs based on a real time feed and the set of batch models, and update one or more critical paths for constraints included in the service level agreement specifying one or more unexpected delays occurred while executing the set of batch graphs with the real time feed,
wherein the revised batch job schedule is annotated with a revised start time, a revised end time, a revised run time, and a revised service level agreement threshold; and
sending, via the one or more hardware processors, a proactive notification to each user alarming the one or more unexpected delays indicating the revised batch job schedule.

2. The processor implemented method as claimed in claim 1, wherein the forecasting model processes the set of batch graphs by:
executing the set of batch graphs over a plurality of forecasting techniques for the start time, and the run time associated with the run history data;
identifying one or more errors occurred while executing the set of batch graphs over the plurality of forecasting techniques for the run history data;
assigning a rank to each forecasting technique based on each error occurrence is below a predefined error threshold; and
determining a forecasted start time, and a forecasted run time based on the rank acquired by corresponding forecasting technique among the plurality of forecasting techniques.

3. The processor implemented method as claimed in claim 1, wherein the job-job regression model processes the set of batch graphs by:
determining one or more correlations between two corresponding batch jobs associated with the set of batch graphs based on the batch job run time data;
obtaining a job correlation coefficient for the one or more correlations;
identifying the precedence relation for the one or more correlations from the set of batch graphs; and
computing the job-job regression model by grouping two correlated batch jobs when the job correlation coefficient is above a predefined regression threshold.

4. The processor implemented method as claimed in claim 1, wherein the job-workload regression model for the set of batch graphs is generated by:
determining for the set of batch graphs, one or more regression correlations between the batch job run time data and a batch job workload from the workload data;
obtaining a dependency data correlation coefficient for the one or more regression correlations; and
computing the job-workload regression model for the set of batch graphs by using the batch job workload and the batch job run time when the dependency data correlation coefficient is above a predefined workload threshold.

5. The processor implemented method as claimed in claim 1, wherein predicting the revised scheduled batch job for the set of batch graphs by:
obtaining from the forecasting model, the forecasted start time to execute the set of batch graphs when the forecasted error is below the predefined error threshold, and the forecasted end time to execute the set of batch graphs along with the one or more error values;
updating the forecasted start time, and the forecasted end time in a depth first search (DFS) graph traversal, wherein the DFS utilizes the dependency data relation; and
predicting the revised batch job schedule for the set of batch graphs based on the real time feed and the DFS graph traversal, wherein the revised batch job schedule is annotated with the revised start time, the revised end time, the revised run time, and the service level agreement.

6. A system for predicting batch processes, comprising:
a memory storing instructions;
one or more communication interfaces; and
one or more hardware processors coupled to the memory via the one or more communication interfaces, wherein the one or more hardware processors are configured by the instructions to:
obtain, a set of batch jobs from one or more users, wherein each batch job comprises a dependency data, a schedule data, a run history data, a service level agreement (SLA), a workload data, and a constant start time, wherein the run history data comprises a start time and an end time;
generate, a set of batch graphs for the set of batch jobs by deriving a metadata for the set of batch jobs based on identifying a dependency data relation, and the schedule data,
wherein the metadata is derived by applying a process flow mining technique on the run history data,
wherein the dependency data relation includes at least one of a direct relation, a casual relation, a parallel relation, and a choice relation, and wherein in each batch graph, a node represents a batch job, an edge represents a precedence relation between the two corresponding batch jobs;

generate, a set of batch models for the set of batch graphs by using the run history data, the workload data, and the dependency data relation, wherein the set of batch models includes at least one of a forecasting model, a job-job regression model, and a job-workload regression model;

generate, a batch job schedule for the set of batch graphs comprising a batch job execution date, and a batch job execution status;

predict, a revised batch job schedule for the set of batch graphs based on a real time feed and the set of batch models, and update one or more critical paths for constraints included in the service level agreement specifying one or more unexpected delays occurred while executing the set of batch graphs with the real time feed, wherein the revised batch job schedule is annotated with a revised start time, a revised end time, a revised run time, and a revised service level agreement threshold; and send, a proactive notification to each user alarming the one or more unexpected delays indicating the revised batch job schedule.

7. The system of claim 6, wherein the forecasting model processes the set of batch graphs by:

executing the set of batch graphs over a plurality of forecasting techniques for the start time, and the run time associated with the run history data;

identifying one or more errors occurred while executing the set of batch graphs over the plurality of forecasting techniques for the run history data;

assigning a rank to each forecasting technique based on each error occurrence is below a predefined error threshold; and determining a forecasted start time, and a forecasted run time based on a highest rank acquired by corresponding forecasting technique among the plurality of forecasting techniques.

8. The system of claim 6, wherein the job-job regression model processes the set of batch graphs by:

determining one or more correlations between two associated batch jobs associated with the set of batch graphs based on the batch job run time data;

obtaining a job correlation coefficient for the one or more correlations;

identifying the precedence relation for the one or more correlations from the set of batch graphs; and computing the job-job regression model by grouping two correlated batch jobs for the set of combination batch jobs when the job correlation coefficient is above a predefined regression threshold.

9. The system of claim 6, wherein the job-workload regression model for the set of batch graphs is generated by:

determining for the set of batch graphs, one or more regression correlations between the batch job run time data and a batch job workload from the workload data;

obtaining a dependency data correlation coefficient for the one or more regression correlations; and computing the job-workload regression model for the set of batch graphs based on the batch job workload and the batch job run time when the dependency data correlation coefficient is above a predefined workload threshold.

10. The system of claim 6, wherein predicting the revised scheduled batch job for the set of batch graphs by:

obtaining from the forecasting model, the forecasted start time to execute the set of batch graphs when the forecasted error is below the predefined error threshold, and the forecasted end time to execute the set of batch graphs along with the one or more error values;

updating the forecasted start time, and the forecasted end time in a depth first search (DFS) graph traversal, wherein the DFS utilizes the dependency data relation; and predicting the revised batch job schedule for the set of batch graphs based on the real time feed and the DFS graph traversal, wherein the revised batch job schedule is annotated with the revised start time, the revised end time, the revised run time, and the service level agreement.

11. One or more non-transitory machine-readable information storage mediums comprising one or more instructions which when executed by one or more hardware processors cause:

obtaining, a set of batch jobs from one or more users, wherein each batch job comprises a dependency data, a schedule data, a run history data, a service level agreement (SLA), a workload data, and a constant start time, wherein the run history data comprises a start time and an end time;

generating, a set of batch graphs for the set of batch jobs by deriving a metadata for the set of batch jobs based on identifying a dependency data relation, and the schedule data, wherein the metadata is derived by applying a process flow mining technique on the run history data, wherein the dependency data relation includes at least one of a direct relation, a casual relation, a parallel relation, and a choice relation, and wherein in each batch graph, a node represents a batch job, an edge represents a precedence relation between the two corresponding batch jobs;

generating, a set of batch models for the set of batch graphs by using the run history data, the workload data, and the dependency data relation, wherein the set of batch models includes at least one of a forecasting model, a job-job regression model, and a job-workload regression model;

generating, a batch job schedule for the set of batch graphs comprising a batch job execution date, and a batch job execution status;

predicting, a revised batch job schedule for the set of batch graphs based on a real time feed and the set of batch models, and update one or more critical paths for constraints included in the service level agreement specifying one or more unexpected delays occurred while executing the set of batch graphs with the real time feed, wherein the revised batch job schedule is annotated with a revised start time, a revised end time, a revised run time, and a revised service level agreement threshold; and sending, a proactive notification to each user alarming the one or more unexpected delays indicating the revised batch job schedule.

12. The one or more non-transitory machine-readable information storage mediums of claim 11, wherein the forecasting model processes the set of batch graphs by:

executing the set of batch graphs over a plurality of forecasting techniques for the start time, and the run time associated with the run history data;

identifying one or more errors occurred while executing the set of batch graphs over the plurality of forecasting techniques for the run history data;

assigning a rank to each forecasting technique based on each error occurrence is below a predefined error threshold; and determining a forecasted start time, and a forecasted run time based on the rank acquired by corresponding forecasting technique among the plurality of forecasting techniques.

13. The one or more non-transitory machine-readable information storage mediums of claim 11, wherein the job-job regression model processes the set of batch graphs by:

determining one or more correlations between two corresponding batch jobs associated with the set of batch graphs based on the batch job run time data;

obtaining a job correlation coefficient for the one or more correlations;

identifying the precedence relation for the one or more correlations from the set of batch graphs; and computing the job-job regression model by grouping two correlated batch jobs when the job correlation coefficient is above a predefined regression threshold.

14. The one or more non-transitory machine-readable information storage mediums of claim 11, wherein the job-workload regression model for the set of batch graphs is generated by:

determining for the set of batch graphs, one or more regression correlations between the batch job run time data and a batch job workload from the workload data;

obtaining a dependency data correlation coefficient for the one or more regression correlations; and computing the job-workload regression model for the set of batch graphs by using the batch job workload and the batch job run time when the dependency data correlation coefficient is above a predefined workload threshold.

15. The one or more non-transitory machine-readable information storage mediums of claim 11, wherein predicting the revised scheduled batch job for the set of batch graphs by:

obtaining from the forecasting model, the forecasted start time to execute the set of batch graphs when the forecasted error is below the predefined error threshold, and the forecasted end time to execute the set of batch graphs along with the one or more error values;

updating the forecasted start time, and the forecasted end time in a depth first search (DFS) graph traversal, wherein the DFS utilizes the dependency data relation; and predicting the revised batch job schedule for the set of batch graphs based on the real time feed and the DFS graph traversal, wherein the revised batch job schedule is annotated with the revised start time, the revised end time, the revised run time, and the service level agreement.

* * * * *